Aug. 18, 1959  G. C. HOOGENDOORN  2,900,007
CENTRAL VALVE FOR PNEUMATIC TIRE WHEEL
Filed Aug. 28, 1957  2 Sheets-Sheet 1

Gilbert C. Hoogendoorn
INVENTOR.

Aug. 18, 1959  G. C. HOOGENDOORN  2,900,007
CENTRAL VALVE FOR PNEUMATIC TIRE WHEEL
Filed Aug. 28, 1957  2 Sheets-Sheet 2

Gilbert C. Hoogendoorn
INVENTOR.

United States Patent Office 2,900,007
Patented Aug. 18, 1959

2,900,007

CENTRAL VALVE FOR PNEUMATIC TIRE WHEEL

Gilbert C. Hoogendoorn, Walnut, Calif.

Application August 28, 1957, Serial No. 680,690

4 Claims. (Cl. 152—415)

This invention relates in general to new and useful improvements in tire valve assemblies, and more specifically to an improved tire valve for pneumatic tire wheels wherein the valve is centrally located.

Nearly all modern automobiles are provided with wheel skirts covering the rear wheels thereof. As a result, when it is desired to check the air of the tires of the rear wheels, in many instances it is necessary to move the car so that the valve of the individual tire is disposed below the skirt. As a result, oftentimes the air pressure of the tire is not checked and thus the tire does not have the optimum pressure therein. Also, because of the fact that the tire valve is normally located in the rim portion of the vehicle wheel, there is a tendency for dirt and other foreign matter, such as snow in the wintertime, packing around the valve stem and thus making it difficult to check the tire pressure. This is another factor in the failure on the part of operators of vehicle and service station attendants to check the pressure of tires.

It is therefore the primary object of this invention to provide an improved valve assembly for vehicle tires, the valve assembly being of such nature whereby the valve stem thereof is mounted centrally of the wheel so that it is retained in the same position irrespective of the position of the wheel and thus is readily available for checking the tire pressure.

Another object of this invention is to provide an improved mounting assembly for a vehicle tire valve, the mounting assembly including a mounting bracket which is securable in overlying relation to a wheel hub by mounting on lug bolts thereof, the valve assembly including a valve stem which is mounted on the mounting bracket centrally of the wheel and which has an air line extending from the valve stem to the vehicle tire.

A further object of this invention is to provide an improved valve assembly for vehicle wheels, the valve assembly being central located whereby as the vehicle wheel rotates, the valve stem of the valve assembly remains in the same relative position, the vehicle wheel including a wheel cover which has a recessed central portion permitting access to the valve stem, the central portion being normally closed by a cover which prevents the entrance of foreign matter around the valve stem.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
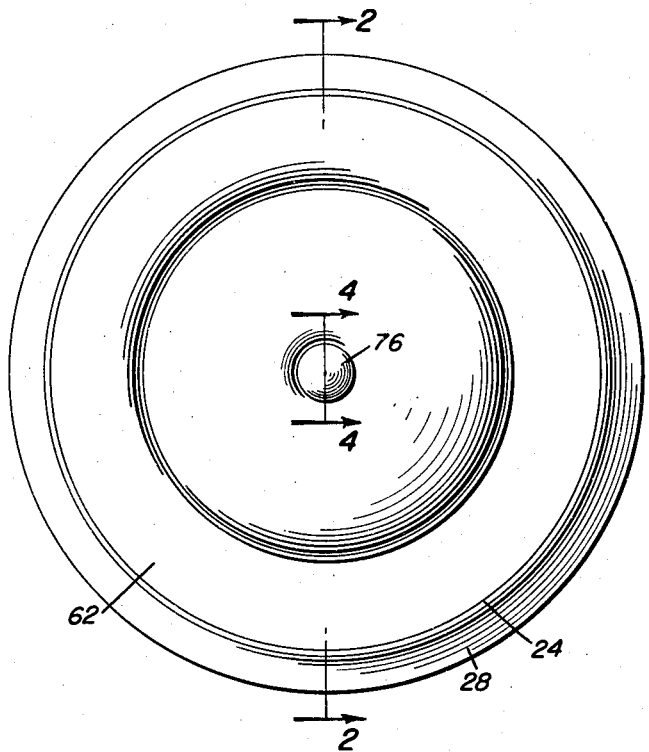
Figure 1 is an elevational view of a front wheel of a vehicle incorporating the present invention.
Figure 4:
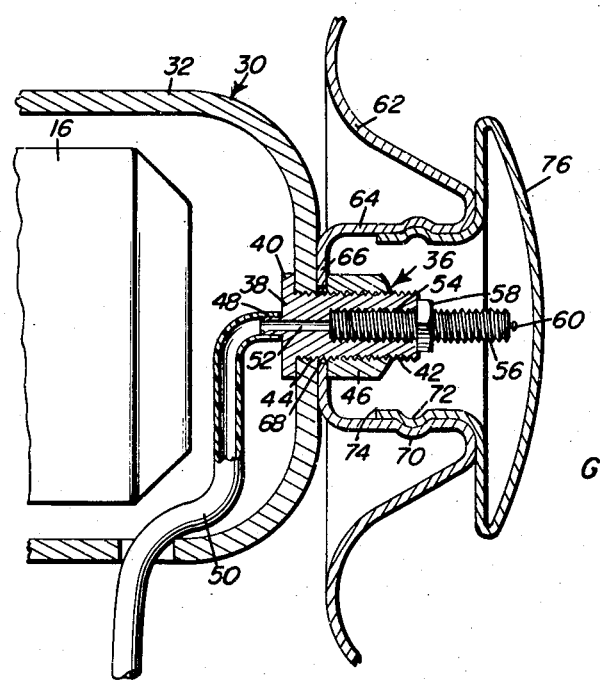
Figure 2:
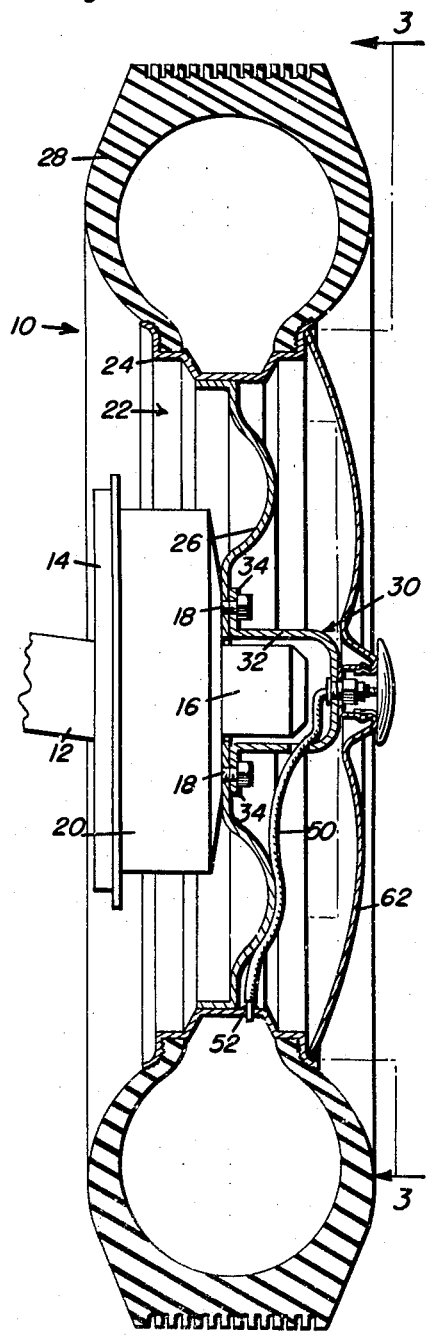
Figure 2 is an enlarged vertical sectional view taken substantially upon the plane indicated by the section line 2—2 of Figure 1 and shows further details of the present invention.
Figure 3:
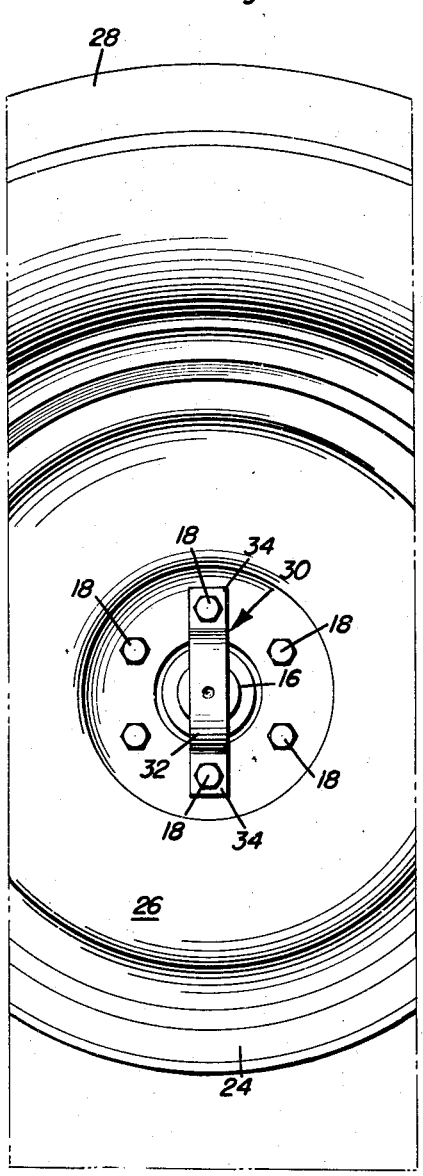

Figure 3 is an enlarged fragmentary elevational view taken substantially upon the plane indicated by the section line 3—3 of Figure 2 and shows the manner in which the mounting bracket for the valve stem is secured to the wheel assembly; and Figure 4 is an enlarged fragmentary sectional view taken substantially upon the plane indicated by the section line 4—4 of Figure 1 and shows the specific details of the valve stem and the manner in which it is mounted on the mounting bracket.

Referring now to the drawings in detail, it will be seen that there is illustrated a vehicle wheel assembly which is referred to in general by the reference numeral 10. The vehicle wheel 10 is a front wheel, although it may be a rear wheel, and includes a spindle portion 12 on which there is rigidly secured a backing plate 14 of a brake assembly. Also mounted on the spindle portion 12, but for relative rotation is a wheel hub 16. The wheel hub 16 is provided with a plurality of lug bolts 18 which function to hold a brake drum 20 in place.

The wheel assembly 10 also includes a wheel 22 which includes a rim 24 and a disc 26. The disc 26 is also clamped on the hub 16 against the brake drum 20 by the lug bolts 18 so as to mount the wheel 22. Carried by the rim 24 is a tire 28 which is illustrated as being of the tubeless type although a tube type tire could be equally as well mounted on the rim 24.

Secured in place on the wheel hub 16 in overlying relation to the projecting portion thereof is a mounting bracket which is referred to in general by the reference numeral 30. The mounting bracket 30 is in the form of a strap which includes a U-shaped central portion 32 and mounting flanges 34. The mounting flanges 34 have passed therethrough two of the lug bolts 18 to secure the mounting bracket 30 in place.

Referring now to Figure 4 in particular, it will be seen that carried by the mounting bracket 30 is a valve stem assembly which is referred to in general by the reference numeral 36. The valve stem assembly 36 includes a fitting 38 which is provided at one end thereof with an annular flange 40 and which has projecting from the annular flange 40 an externally threaded stem portion 42. The stem portion 42 extends through a central opening 44 in the mounting bracket 30 and it has threadedly engaged thereon a nut 46. The nut 46 draws the annular flange 40 against the inner side of the mounting bracket 30 so as to clamp the fitting 36 in place.

Projecting from the left end of the fitting 38, as viewed in Figure 4, is a reduced tubular portion 48 over which there is secured one end of an air line 50. The opposite end of the air line 50 extends to a fitting 52 carried by the rim 24, as is shown in Figure 2. In the case of a tube type tire, the fitting 52 would be part of the tube.

Extending through the stem portion 48 and a left part of the fitting 38 is a bore 52 of a small diameter. The bore 52 opens into an internally threaded bore 54. Removably threadedly engaged in the bore 54 is an externally threaded valve stem 56. The valve stem 56 is locked in place by means of a locknut 58. The valve stem 56 is provided with the conventional type of valve core 60 which controls the passage of air through the valve stem 56.

The wheel assembly 10 also includes a wheel cover 62. The wheel cover 62 engages the rim 24 and covers substantially all of the wheel 22. The wheel cover 62 has an inwardly offset central portion 64 which forms a receptacle for the valve stem assembly 36. The offset portion 64 terminates in an annular flange 66 having an opening 68 therethrough through which passes the stem portion 42 of the fitting 38. The nut 46 engages the annular portion 66 and serves to clamp the wheel cover 62 in place. The recessed portion 64 is provided with an outwardly projecting annular part 70 which is engaged by a similar annular part 72 on a sleeve portion 74 of a cover 76. The sleeve portion 74 is normally telescoped in the offset portion 64 and interlocked therewith to hold the cover 76 in place. The cover 76 protects the valve assembly 36.

Inasmuch as the valve assembly 36 is mounted centrally of the wheel 22, it will be readily apparent that no matter what position to which the wheel 22 has rotated, the valve stem 56 remains in the same position because of its central location with respect to the hub 16. Thus in the case of a vehicle with shirts, the valve stem 56 remains accessible at all times with the result that either the operator of the vehicle or the service station attendant will have a tendency to check the air pressure of the tire periodically thus maintaining the air pressure at the optimum pressure. Further, because of the use of the cover 76, it will be seen that the valve assembly 36 is protected from the foreign elements. The cover 76 has an enlarged exterior portion which may be readily gripped and pulled off thus eliminating the requirement of any tools to remove the cover 76.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle wheel assembly, a tire valve assembly, said wheel assembly including a wheel hub, lug bolts carried by said wheel hub, a wheel including a rim and a central disc, said disc being mounted on said lug bolts, a wheel cover, and a tire mounted on said rim, said tire valve assembly including a mounting bracket generally overlying said hub and mounted on said lug bolts, a valve stem disposed along the axis of said hub and secured to said mounting bracket, an air line connecting said valve stem to said tire, said wheel cover having a central opening therein providing access to said valve stem.

2. In combination with a vehicle wheel assembly, a tire valve assembly, said wheel assembly including a wheel hub, lug bolts carried by said wheel hub, a wheel including a rim and a central disc, said disc being mounted on said lug bolts, a wheel cover, a tire mounted on said rim, said tire valve assembly including a mounting bracket generally overlying said hub and mounted on said lug bolts, a valve stem disposed along the axis of said hub and secured to said mounting bracket, an air line connecting said valve stem to said tire, said wheel cover having a central opening therein providing access to said valve stem, and a removable dust cap carried by said wheel cover and closing said central opening.

3. In combination with a vehicle wheel assembly, a tire valve assembly, said wheel assembly including a wheel hub, lug bolts carried by said wheel hub, a wheel including a rim and a central disc, said disc being mounted on said lug bolts, a wheel cover, and a tire mounted on said rim, said tire valve assembly including a mounting bracket generally overlying said hub and mounted on said lug bolts, a valve stem disposed along the axis of said hub and secured to said mounting bracket, an air line connecting said valve stem to said tire, said wheel cover having a recessed central part defining a central opening receiving said valve stem, said valve stem including a mounting fitting, said mounting fitting engaging and clamping said central part against said mounting bracket.

4. In combination with a vehicle wheel assembly, a tire valve assembly, said wheel assembly including a wheel hub, lug bolts carried by said wheel hub, a wheel including a rim and a central disc, said disc being mounted on said lug bolts, a wheel cover, and a tire mounted on said rim, said tire valve assembly including a mounting bracket generally overlying said hub and mounted on said lug bolts, a valve stem disposed along the axis of said hub and secured to said mounting bracket, an air line connecting said valve stem to said tire, said wheel cover having a recessed central part defining a central opening receiving said valve stem, said valve stem including a mounting fitting, said mounting fitting engaging and clamping said central part against said mounting bracket, and a removable dust cap carried by said wheel cover and closing said central opening.

References Cited in the file of this patent

UNITED STATES PATENTS

| | | |
|---|---|---|
| 2,043,123 | Slick | June 2, 1936 |
| 2,239,676 | Henry | Apr. 29, 1941 |
| 2,612,931 | Orlicki | Oct. 7, 1952 |